US011909828B2

United States Patent
Kweon et al.

(10) Patent No.: US 11,909,828 B2
(45) Date of Patent: Feb. 20, 2024

(54) DEVICE AND METHOD FOR HANDLING ALWAYS-ON PDU SESSION IN WIRELESS COMMUNICATION SYSTEM

(71) Applicant: Samsung Electronics Co., Ltd., Suwon-si (KR)

(72) Inventors: Kisuk Kweon, Suwon-si (KR); Kyungjoo Suh, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/766,525

(22) PCT Filed: Sep. 29, 2020

(86) PCT No.: PCT/KR2020/013423
§ 371 (c)(1),
(2) Date: Apr. 4, 2022

(87) PCT Pub. No.: WO2021/066577
PCT Pub. Date: Apr. 8, 2021

(65) Prior Publication Data
US 2023/0045230 A1 Feb. 9, 2023

(30) Foreign Application Priority Data

Oct. 4, 2019 (KR) .................. 10-2019-0123142

(51) Int. Cl.
*H04L 67/142* (2022.01)
*H04W 60/00* (2009.01)
*H04W 84/04* (2009.01)

(52) U.S. Cl.
CPC .......... *H04L 67/142* (2013.01); *H04W 60/00* (2013.01); *H04W 84/042* (2013.01)

(58) Field of Classification Search
None
See application file for complete search history.

(56) References Cited

U.S. PATENT DOCUMENTS 11,653,178 B2 * 5/2023 Qiao .................... H04W 64/00
455/456.3
2018/0199398 A1 7/2018 Dao et al.
(Continued)

FOREIGN PATENT DOCUMENTS

KR 10-2019-0043079 A 4/2019
WO WO-2020034802 A1 * 2/2020 ........ H04W 36/0033

OTHER PUBLICATIONS

International Search Report and Written Opinion of the International Searching Authority dated Jan. 20, 2021, in connection with International Application No. PCT/KR2020/013423, 9 pages.
(Continued)

*Primary Examiner* — Otis L Thompson, Jr.

(57) ABSTRACT

Disclosed is a $5^{th}$ generation (5G) or pre-5G communication system for supporting a data transmission rate higher than that of a $4^{th}$ generation (4G) communication system such as long term evolution (LTE). According to various embodiments of the disclosure, provided is a method for operating an access and mobility management function (AMF) in a wireless communication system, comprising the steps of: receiving, from user equipment (UE), a service request including a list of protocol data unit (PDU) sessions to be activated, or a message about a mobility registration update; checking, on the basis of UE context information about the UE, whether identifiers (IDs) of all of always-on PDU sessions are included in the list of PDU sessions to be activated; and, when an omitted always-on PDU session is checked from the list of the PDU sessions to be activated, transmitting, to a session management function (SMF), a (Continued)

Nsmf_PDUSession_UpdateSMContext request message for requesting user plane activation of the omitted always-on PDU session.

15 Claims, 8 Drawing Sheets

(56) References Cited

U.S. PATENT DOCUMENTS

| | | |
|---|---|---|
| 2019/0174449 A1 | 6/2019 | Shan et al. |
| 2020/0214054 A1* | 7/2020 | Qiao .................. H04W 48/18 |
| 2020/0267554 A1* | 8/2020 | Faccin ................ H04L 63/101 |
| 2020/0351980 A1* | 11/2020 | Talebi Fard .......... H04W 68/00 |
| 2021/0204357 A1* | 7/2021 | Tang ................... H04W 76/25 |
| 2021/0258853 A1* | 8/2021 | Wang ................ H04W 28/0268 |
| 2022/0022089 A1* | 1/2022 | Zhu .................. H04W 28/0268 |
| 2022/0104164 A1* | 3/2022 | Kedalagudde ........ H04W 60/04 |
| 2022/0174580 A1* | 6/2022 | You .................... H04W 12/102 |
| 2023/0084094 A1* | 3/2023 | Youn ................ H04W 36/0022 370/331 |
| 2023/0156577 A1* | 5/2023 | Muõoz de la Torre Alonso ......... H04W 48/16 370/329 |
| 2023/0156752 A1* | 5/2023 | Tuong Tran .......... H04W 72/51 370/329 |
| 2023/0156850 A1* | 5/2023 | Cirik ................. H04L 5/0091 370/329 |

OTHER PUBLICATIONS

ETSI TS 123 502 V15.5.1 (May 2019), Technical Specification, 5G; Procedures for the 5G System (5GS), (3GPP TS 23.502 version 15.5.1 Release 15), May 2019, 353 pages.

Huawei, et al., "TS 23.502 Update procedures related with always-on PDU session for URLLC service," S2-1906523, 3GPP TSG-SA WG2 Meeting #133, Reno, USA, May 13-17, 2019, 18 pages.

NTT Docomo, et al., "Selective deactivation for always-on PDU sessions," S2-1812929 (revision of S2-1811844), 3GPP TSG-SA WG2 Meeting #129-Bis, West Palm Beach, USA, Nov. 26-30, 2018, 4, pages.

* cited by examiner

UE context in AMF

| | Communication unit |
|---|---|
| NSSAI(s) | The S-NSSAI(s) associated to the PDU Session |
| DNN | The associated DNN for the PDU Session |
| Network Slice Instance id | The network Slice Instance information for the PDU Session |
| PDU Session ID | The identifier of the PDU Session |
| SMF Information | The associated SMF identifer and SMF address for the PDU session |
| Access Type | The current access type for this PDU Session |
| EBI-ARP list | The allocated EBI and associated ARP pairs for this PDU Session |
| 5GSM Core Network Capability | The UEs 5GSM Core Network Capability as defined in TS 23.501 [2] clause 5.4.4b |
| SMF derived CN assisted RAN parameters tuning | These are PDU Session specific parameters received from the SMF and used by the AMF to derive the Core Network assisted RAN parameters tuning |
| Always-on Indication | The indication of always-on PDU Session |

FIG.4

DEVICE AND METHOD FOR HANDLING ALWAYS-ON PDU SESSION IN WIRELESS COMMUNICATION SYSTEM

CROSS-REFERENCE TO RELATED APPLICATIONS

This application is a 371 National Stage of International Application No. PCT/KR2020/013423, filed Sep. 29, 2020, which claims priority to Korean Patent Application No. 10-2019-0123142, filed Oct. 4, 2019, the disclosures of which are herein incorporated by reference in their entirety.

BACKGROUND

1. Field

The disclosure generally relates to a wireless communication system and, more particularly, to an apparatus and a method for handling an always-on PDU session.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (mmWave) bands (e.g., 60 GHz bands) so as to accomplish higher data rates. To decrease the propagation loss and increase the transmission distance of the radio waves in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

SUMMARY

Based on the above discussion, the disclosure provides an apparatus and a method for handling an always-on PDU session in a wireless communication system.

According to various embodiments of the disclosure, a method for operating an access and mobility management function (AMF) in a wireless communication system is provided. The method includes: receiving, from a user equipment (UE), a service request including a list of protocol data unit (PDU) sessions to be activated or a message regarding a mobility registration update; identifying, based on UE context information of the UE, whether identifiers (IDs) of all of always-on protocol data unit (PDU) sessions are included in the list of PDU sessions to be activated; and when an always-on PDU session omitted from the list of the PDU sessions to be activated is identified, transmitting, to a session management function (SMF), a Nsmf_PDUSession_UpdateSMContext request message for requesting user plane activation of the omitted always-on PDU session.

According to various embodiments of the disclosure, a method for operating a session management function (SMF) in a wireless communication system is provided. The method includes: receiving, from an access and mobility management function (AMF), a Nsmf_PDUSession_UpdateSMContext request message for requesting user plane activation of an always-on protocol data unit session, which is omitted from a list of PDU sessions to be activated of a user equipment (UE); receiving, from the AMF, a Namf_Exposure_Notify message including a connection management-connected (CM-connected) state notification of the UE; and identifying whether the omitted always-on PDU session has been omitted from the list of PDU sessions to be activated.

According to various embodiments of the disclosure, an apparatus for an access and mobility management function (AMF) in a wireless communication system is provided. The apparatus includes a transceiver; and at least one processor, wherein the at least one processor is configured to receive, from a user equipment (UE), a service request including a list of protocol data unit (PDU) sessions to be activated or a message regarding a mobility registration update; identify, based on UE context information of the UE, whether identifiers (IDs) of all of always-on protocol data unit (PDU) sessions are included in the list of PDU sessions to be activated; and when an always-on PDU session omitted from the list of the PDU sessions to be activated is identified, transmit, to a session management function (SMF) a Nsmf_PDUSession_UpdateSMContext request message for requesting user plane activation of the omitted always-on PDU session.

An apparatus and a method according to various embodiments of the disclosure may provide an apparatus and a method for handling an always-on PDU session in a wireless communication system.

Advantageous effects obtainable from the disclosure may not be limited to the above-mentioned effects, and other effects which are not mentioned may be clearly understood, through the following descriptions, by those skilled in the art to which the disclosure pertains.

BRIEF DESCRIPTION OF THE DRAWINGS

FIG. 4 illustrates UE context in AMF information in a wireless communication system according to various embodiments of the disclosure;

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for providing subscription data to a non-sub scriber-registered terminal in a wireless communication system.

In the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Furthermore, various embodiments of the disclosure will be described using terms defined in some communication standards (e.g., 3rd generation partnership project (3GPP) standards), but they are illustrated merely for the sake of description. Various embodiments of the disclosure may be easily applied to other communication systems through modifications.

Figure 1:
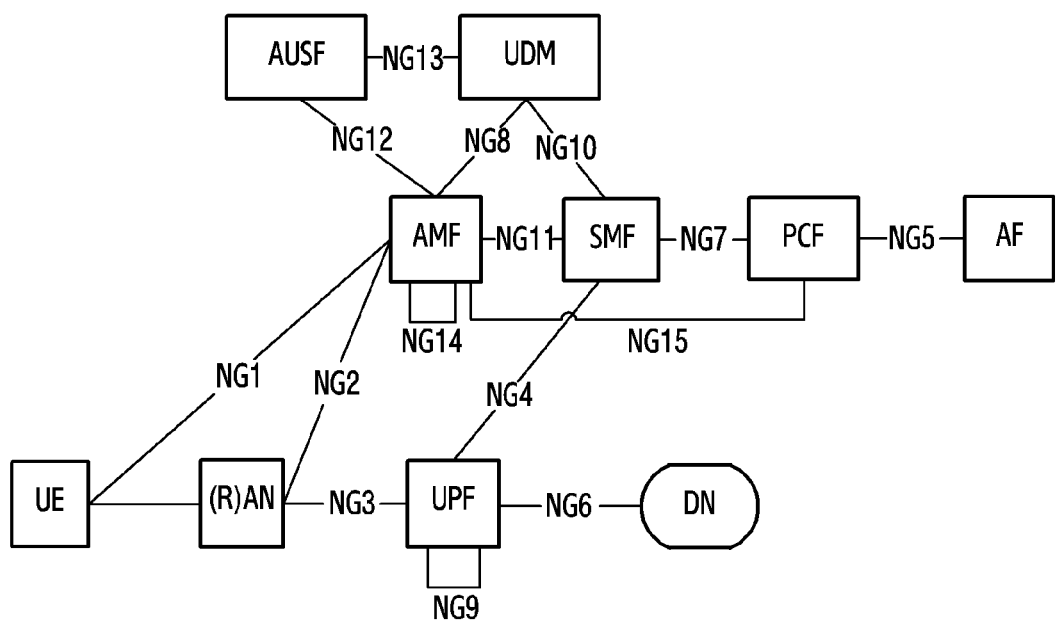
FIG. 1 illustrates an example of a 5G system architecture using a reference point representation in a wireless communication system.

FIG. 1 illustrates an example of a 5G system architecture using a reference point representation in a wireless communication system.

Referring to FIG. 1, the 5G system architecture may include various elements (that is, a network functions (NFs)), and FIG. 1 illustrates some of the various elements, for example, an authentication server function (AUSF), a (core) access and mobility management function (AMF), a session management function (SMF), a policy control function (PCF), an application function (application function, AF), unified data management (UDM), a data network (DN), a user plane function (UPF), a (radio) access network ((R)AN), and a terminal, that is, a user equipment (UE).

Each of NFs supports the following functions.

The AUSF stores data for UE authentication.

The AMF provides a function for access and mobility management in units of UE, and may be connected to one AMF per UE basically.

Specifically, the AMF supports functions such as signaling between CN nodes for mobility between 3GPP access networks, termination of a radio access network (RAN) CP interface (i.e., NG2 interface), termination of NAS signaling (NG1), NAS signaling security (NAS ciphering and integrity protection), AC security control, registration management (registration area management), connection control, idle mode UE reachability (including control and execution of paging retransmission), mobility management control (subscription and policy), intra-system mobility and inter-system mobility support, network slicing support, SMF selection, lawful intercept (with respect to interface to AMF event and L1 system), providing of session management (SM) message transfer between UE and SMF, transparent proxy for SM message routing, access authentication, access authorization including roaming right check, providing of SMS message transfer between UE and SMSF, security anchor function (SAF), and/or security context management (SCM).

Some or all functions of the AMF may be supported in a single instance of one AMF.

The DN refers to an operator service, Internet access or third party service and the like, for example. The DN transmits a downlink protocol data unit (PDU) to a UPF or receives, from the UPF, a PDU transmitted from the UE.

The PCF receives information regarding packet flow from an application server and provides a function of determining policies such as mobility management and session management. Specifically, the PCF supports unified policy framework support for controlling network operation, providing of policy rules such that CP functions (e.g., AMF, SMF, and the like) enforce the policy rules, and realization of a front end for accessing related subscription information for policy determination in user data repository (UDR).

The SMF provides a session management function and may be managed by different SMFs per session when the UE has a plurality of sessions.

Specifically, the SMF supports session management (e.g., session establishment, modification, and cancellation including maintenance of a tunnel between the UDR and AN node), UE IP address allocation and management (including optional authentication), selection and control of the UP function, configuration of traffic steering for the UPF to route traffic to an appropriate destination, termination of interface to policy control functions, implementation of control part of policy and QoS, lawful intercept (with respect to interface to SM event and LI system), termination of SM part of NAS message, downlink data notification, AN specific SM information initiator (transfer to AN through N2 via AMF), determination of SSC mode of session, and roaming.

Some or all functions of the SMF may be supported in a single instance of one SMF.

The UDM stores user subscription data, policy data and the like. The UDM includes two parts, that is, application front end (FE) and a user data repository (UDR).

The FE includes a UDM FE in charge of location management, subscription management and credential processing and the like, and a PCF in charge of policy control. The UDR stores data necessary for functions provided by the UDM-FE and a policy profile required by the PCF. Data stored in the UDR includes a subscription identifier, security credential, and policy data and user subscription data including access and mobility related subscription data and session related subscription data. The UDM-FE accesses subscription information stored in the UDR and supports functions such as authentication credential processing, user identification handling, access authentication, registration/mobility management, subscription management, and SMS management.

The UPF transfers a downlink PDU received from the DN to the UE via a (R)AN and transfers an uplink PDU received from the UE to the DN via the (R)AN.

Specifically, the UPF supports functions such as anchor point for intra/inter RAT mobility, an external PDU session point of interconnect to a data network, packet routing and forwarding, user plane part of packet inspection and policy rule implementation, lawful intercept, traffic usage reporting, an uplink classifier for supporting routing of traffic flow to a data network, a branch point for supporting multi-homed PDU session, QoS handling for user plane (e.g., packet filtering, gating, and uplink/downlink rate implementation), uplink traffic verification (SDF mapping between service data flow (SDF) and QoS flow), transport level packet marking in uplink and downlink, downlink packet buffering, and downlink data notification triggering. Some or all functions of the UPF may be supported in a single instance of one UPF.

The AF interacts with a 3GPP core network for service providing (e.g., supporting functions such as application influence on traffic routing, network capability exposure access, and interaction with policy framework for policy control).

(R)AN is a generic term for new radio access networks supporting both evolved E-UTRAN which is an evolved version of 4G radio access technology and new radio access technology (new ratio (NR)) (e.g., gNB).

The gNB supports functions such as functions for radio resource management (i.e., radio bearer control, radio admission control, connection mobility control, dynamic allocation of resources to UE on uplink/downlink (i.e., scheduling), Internet protocol (IP) header compression, encryption of user data stream and integrity protection, selection of AMF at the time of UE attachment when routing to AMF is not determined from information provided to the UE, user plane data routing to UPFs, control plane information routing to AMF, connection setup and cancellation, scheduling and transmission of a paging message (generated from AMF), scheduling and transmission of system broadcast information (generated from AMF or operating and maintenance (O&M)), configuration of measurement and measurement report for mobility and scheduling, transport level packet marking on uplink, session management, support of network slicing, QoS flow management and mapping to data radio bearer, support of UE in an inactive mode, a NAS message distribution function, a NAS node selection function, radio access network sharing, dual connectivity, and tight interworking between NR and E-UTRA.

The UE refers to a user equipment. A user device may also be called a terminal, mobile equipment (ME), a mobile station and the like. Further, the user equipment may be a portable device such as a notebook computer, a cellular phone, a personal digital assistant (PDA), a smartphone, and a multimedia device, or may be a device which is not portable such as a personal computer (PC) and a vehicle-mounted device.

Although an unstructured data storage network function (UDSF), a structured data storage network function (SDSF), a network exposure function (NEF), and an NF repository function (NRF) are not shown in FIG. 1 for the clarity of explanation, all NFs shown in FIG. 1 may perform interactions with the UDSF, NEF, and NRF as necessary.

The NEF provides a measure for safely exposing services and capabilities for 3rd party, internal exposure/re-exposure, application function, and edge computing, for example, provided by 3GPP network functions. The NEF receives information (based on exposed capabilities of other network functions) from other network functions. The NEF may store received information as structured data using standardized interface to data storage network functions. The stored information may be re-exposed to other network function(s) and application function(s) by the NEF and used for other purposes such as analysis.

The NRF supports a service discovery function. The NRF receives an NF discovery request from an NF instance and provides discovered information on the NF instance to the NF instance. Further, the NRF maintains available NF instances and services supported by the NF instances.

SDSF is an optional function for supporting a function of storing and retrieving information as structured data by any NEF.

UDSF is an optional function for supporting a function of storing and retrieving information as unstructured data by any NF.

Meanwhile, FIG. 1 illustrates a reference model for a case in which a UE accesses one DN using one PDU session for convenience of explanation, but the disclosure is not limited thereto.

The UE may simultaneously access two (i.e., local and central) data networks by using multiple PDU sessions. Here, two SMFs may be selected for different PDU sessions. However, each SMF may have capability for controlling both the local UPF and the central UPF within the PDU session.

In addition, the UE may simultaneously access two (i.e., local and central) data networks provided within a single PDU session.

In the 3GPP system, a conceptual link connecting NFs in a 5G system is defined as a reference point. Reference points included in the 5G system architecture shown in FIG. 1 are described below.

Figure 2:
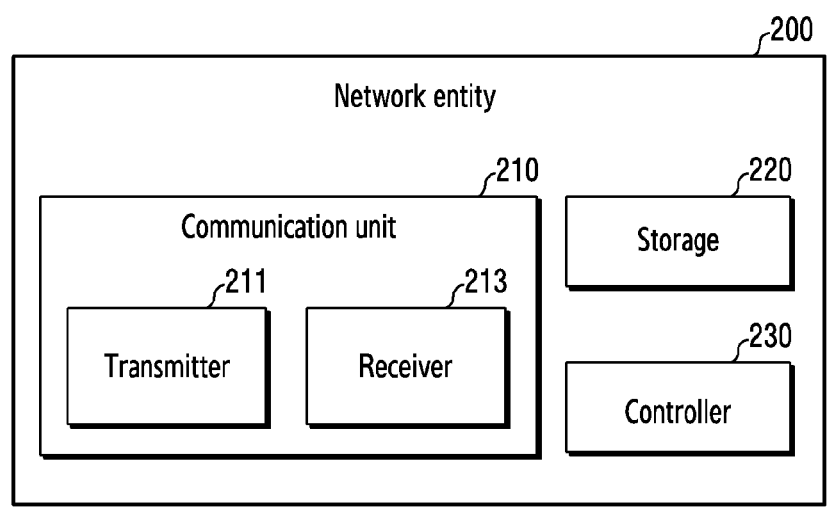
FIG. 2 illustrates a configuration of a network entity in a wireless communication system according to various embodiments of the disclosure.

NG1: Reference point between the UE and the AMF
NG2: Reference point between the (R)AN and the AMF
NG3: Reference point between the (R)AN and the UPF
NG4: Reference point between the SMF and the UPF
NG5: Reference point between the PCF and the AF
NG6: Reference point between the UPF and a data network
NG7: Reference point between the SMF and the PCF
NG8: Reference point between the UDM and the AMF
NG9: Reference point between two core UPFs
NG10: Reference point between the UDM and the SMF
NG11: Reference point between the AMF and the SMF
NG12: Reference point between the AMF and the AUSF
NG13: Reference point between the UDM and the authentication server function (AUSF)
NG14: Reference point between two AMFs
NG15: Reference point between the PCF and the AMF in a case of a non-roaming scenario and reference point between the PCF and the AMF in a visited network in a case of a roaming scenario FIG. 2 illustrates a configuration of a network entity in a wireless communication system according to various embodiments of the disclosure.

A network entity of the disclosure is a concept including a network function according to system implementation. Terms such as "~unit" or terms ending with suffixes "~er" and "~or" used below refers to a unit which processes at least one function or operation, which may be implemented as hardware, software, or a combination of hardware and software.

A network entity 200 according to various embodiments of the disclosure may include a communication unit 210, a storage 220, and a controller 230 for controlling overall operations of the network entity 200.

The communication unit 210 transmits or receives signals to or from other network entities. Accordingly, all or part of the communication unit 210 may be referred to as a "transmitter 240", a "receiver 250", or a "transceiver 210".

The storage 220 stores data such as a basic program, an application program, and configuration information for the operation of the network entity 200. The storage 220 may be configured as a volatile memory, a non-volatile memory, or a combination of a volatile memory and a non-volatile memory. In addition, the storage 220 provides the stored data according to the request of the controller 230.

The controller 230 controls overall operations of the network entity 200. For example, the controller 230 transmits or receives a signal through the communication unit 210. Further, the controller 230 writes and reads data in and from the storage 220. In addition, the controller 230 may perform functions of a protocol stack required by the communication standard. To this end, the controller 230 may include a circuit, an application-specific circuit, at least one processor, or microprocessor, or may be a part of a processor. In addition, a part of the communication unit 210 and the controller 230 may be referred to as a communication processor (CP). The controller 230 may control the network entity 200 to perform an operation according to any one of various embodiments of the disclosure.

It should be noted that the communication unit 210 and the controller 230 are not necessarily implemented as separate modules, and may be implemented as a single component in the form of a single chip or a software block. The communication unit 210, the storage 220, and the controller 230 may be electrically connected to each other. In addition, the operations of the network entity 200 may be realized by providing the storage 220 storing the corresponding program code in the network entity 200.

The network entity 200 includes a network node, which may include one of base station (RAN), AMF, SMF, UPF, NF, NEF, NRF, CF, NSSF, UDM, AF, AUSF, SCP, UDSF, context storage, OAM, EMS, a configuration server, an identifier (ID) management server, and a UE.

Various embodiments of the disclosure relate to a 5G wireless communication network system, and relate to a method and apparatus for preventing omission of activation of a user plane resource of an always-on PDU session when a UE transitions to a connection management-connected (CM-CONNECTED) state.

In order to meet wireless data traffic demands that have increased after 4G communication system commercialization, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, an implementation of the 5G communication system in a mmWave band (for example, 60 GHz (70 GHz) band) is being considered. In the 5G communication system, technologies such as beamforming, massive multiple-input multiple-output (massive MIMO), full dimensional MIMO (FD-MIMO), array antenna, analog beam-forming, and large-scale antenna technologies are being discussed in order to mitigate a propagation path loss in the ultrahigh-frequency band and increase a propagation transmission distance. Further, in the 5G communication system, technologies such as evolved small cell, advanced small cell, cloud radio access network (RAN), ultra-dense network, device-to-device communication (D2D), wireless backhaul, moving network, cooperative communication, coordinated multi-points (CoMP), and received interference cancellation have been developed in order to improve the system network. In addition, the 5G system has developed advanced coding modulation (ACM) schemes such as hybrid FSK and QAM modulation (FQAM) and sliding window superposition coding (SWSC), and has further developed advanced access technologies such as filter bank multi carrier (FBMC), non-orthogonal multiple access (NOMA), and sparse code multiple access (SCMA).

The 5G communication system may support various terminals/services. Examples of terminals/services supported by the 5G communication system include enhanced mobile broadband (eMBB), ultra-reliable low latency communications (URLLC), and 5G cellular Internet of Things (CIoT). Each of these terminals/services has different requirements for a core network. In a case of eMBB service, large-capacity data transmission such as multimedia service is required, and 5G CIoT service requires communication where many devices transmit small amount of data periodically or occasionally. In a case of URLLC service, high stability and low latency are required.

The disclosure is to provide a method for preventing activation of a user plane resource of an always-on PDU session of a UE from being omitted when the UE transitions to a CM-connected state.

Various embodiments of the disclosure include: transferring, by an SMF, an always-on indication to an AMF by using communication between the AMF and the SMF and storing the always-on indication in UE context in the AMF, in order to notify the AMF of establishment of an always-on PDU session when a UE has established the always-on PDU session; and when ID of the always-on PDU session is omitted from a "list of PDU sessions to be activated" parameter during a registration procedure and a service request procedure of the UE, identifying, by the AMF, the omission of the always-on PDU session ID based on the always-on indication and notifying the SMF of the identified always-on PDU session omission. Another method for recognizing, by the SMF, omission of the activation of a user plane resource of the always-on PDU session may include a method of subscribing to an AMF event exposure service.

Advantages and features of the disclosure and methods of achieving them will be apparent with reference to embodiments described below in detail in conjunction with the accompanying drawings. However, the disclosure is not limited to the embodiments disclosed below, but may be implemented in various forms. The present embodiments are merely provided to complete the disclosure of the disclosure and to fully inform a person skilled in the art of the disclosure of the scope of the disclosure, and the disclosure is defined by the scope of claims. The same reference numerals refer to the same elements throughout the specification.

It should be understood that combinations of blocks in flowcharts or flow chart diagrams may be performed by computer program instructions. Since these computer program instructions may be loaded into a processor of a general-purpose computer, a special-purpose computer, or another programmable data processing apparatus, the instructions, which are performed by a processor of a computer or another programmable data processing apparatus, generates units for performing functions described in the flowchart block(s). The computer program instructions may be stored in a computer-usable or computer-readable memory capable of directing a computer or another programmable data processing apparatus in order to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "~unit" in the disclosure indicates a software component or hardware component such as a field programmable gate array (FPGA) or an application specific integrated circuit (ASIC), and performs a specific function. However, the term "~unit" is not intended to be limited to software or hardware. The term "~unit" may be configured so as to be in an addressable storage medium, or may be configured so as to operate one or more processors. Thus, for example, the term "~unit" may include components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and the "~units" may be associated with a smaller number of components and "~units", or may be divided into additional components and "~units". Furthermore, the components and "~units" may be embodied to reproduce one or more CPUs in a device or security multimedia card. In addition, in the embodiment, "~unit" may include at least one processor.

Hereinafter, embodiments of the disclosure will be described in detail with reference to the accompanying drawings. In addition, in describing the disclosure, if it is determined that a detailed description of a related known function or configuration may unnecessarily obscure the subject matter of the disclosure, the detailed description thereof will be omitted. In addition, the terms to be described later are terms defined in consideration of functions in the disclosure, which may vary according to intentions or customs of users and operators. Therefore, the definition should be made based on the content throughout this specification.

Hereinafter, the base station is a subject performing resource allocation of the terminal, and may be at least one of an eNode B, a Node B, a base station (BS), a next generation radio access network (NG RAN), a wireless access unit, a base station controller, or a node on a network. The terminal may include a user equipment (UE), a next generation UE (NG UE), a mobile station (MS), a cellular phone, a smart phone, a computer, or a multimedia system capable of performing a communication function. In addition, the embodiment of the disclosure will be described below by taking the 5G system as an example, but the embodiment of the disclosure may be applied to other communication systems having a similar technical background. In addition, the embodiment of the disclosure may be applied to other communication systems through some modifications within the scope of the disclosure without departing from the scope of the disclosure by the judgment of those skilled in the art.

As a wireless communication system evolves from a 4G system to a 5G system, a next-generation core that is a new core network is defined. The new core network virtualizes all the existing network entities (NE) to form a network function (NF). In addition, the mobility management entity (MME) function is divided into mobility management (MM) and session management (SM), and the UE mobility management is performed in steps according to the usage type of the UE.

An always-on PDU session is a PDU session in which a user plane resource is always activated when a UE transitions from a CM-IDLE state to a CM-CONNECTED state. A PDU session in which a user plane resource is deactivated needs to activate first the user plane resource in order to transmit data, and thus an additional time is taken when performing data transmission. Therefore, in a case of a URLLC service sensitive to data transmission latency, data is transmitted through an always-on PDU session.

In order for the UE to transition to the CM-CONNECTED state, a service request procedure and a mobility registration update procedure are performed. Here, when the UE transitions to the CM-CONNECTED state, a user plane resource of the corresponding PDU session may be activated including the ID of the always-on PDU session in a "list of PDU sessions to be activated" parameter. Even though there is no data to be transmitted or even though the UE transitions to the CM-CONNECTED state for signaling, the always-on PDU session needs to always activate the user plane resource.

The disclosure is to propose a method for handling an always-on PDU session by a UE in a 5G next generation core network. Specifically, the disclosure proposes a method for preventing the omission of user plane activation (UP activation) due to the omission of an always-on PDU session ID (PDU session ID) from a list of PDU sessions to be activated when the UE transitions to a CM-CONNECTED state.

Figure 3:
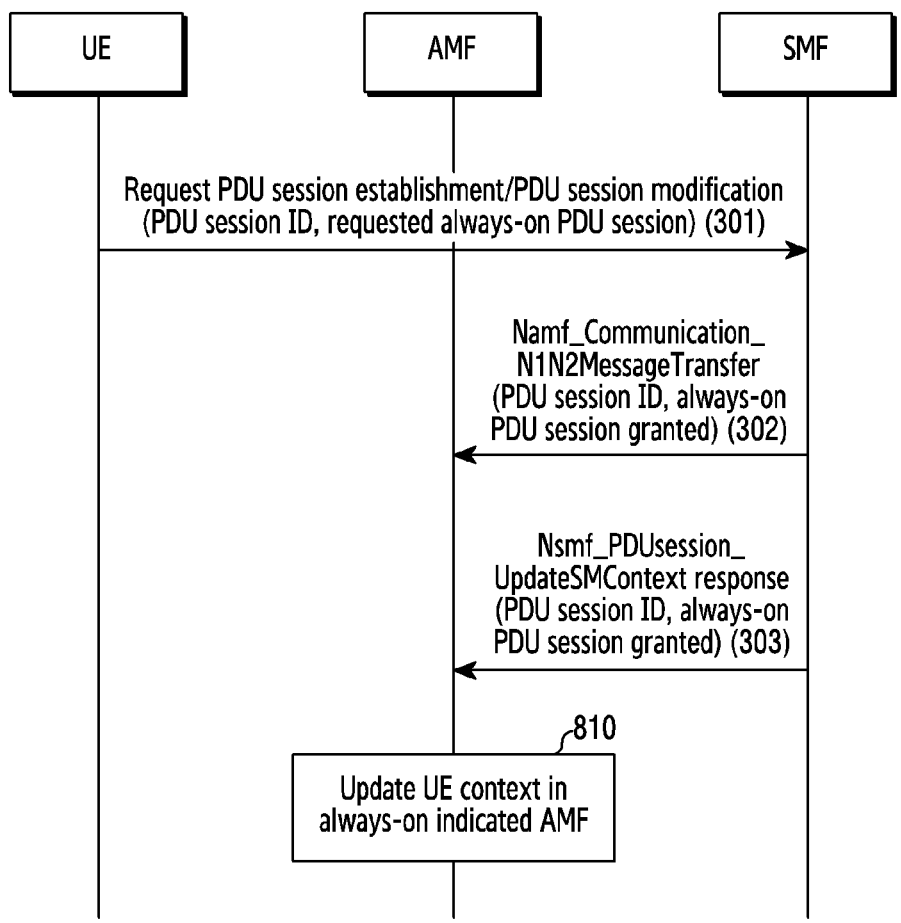
FIG. 3 illustrates a PDU session establishment/PDU session modification procedure of a UE in a wireless communication system according to various embodiments of the disclosure.

FIG. 3 illustrates a PDU session establishment/PDU session modification procedure of a UE in a wireless communication system according to various embodiments of the disclosure.

Specifically, FIG. 3 illustrates a PDU session establishment/PDU session modification procedure of a UE according to various embodiments of the disclosure.

In operation 301, a UE transmits a PDU session establishment/PDU session modification request to an AMF. Here, the PDU session establishment/PDU session modification request may include a PDU session ID and information on the requested always-on PDU session.

The UE may establish a PDU session and modify an existing PDU session in order to perform data transmission. Here, the UE may request a PDU session as an always-on PDU session according to a request of a higher layer. An SMF determines whether to establish the PDU session as the always-on PDU session.

The UE requests a network (SMF) to establish and modify a PDU session through a PDU session establishment request message or a PDU session modification request message. Here, in order to request establishment of a PDU session as an always-on PDU session and changing of an existing PDU session to the always-on PDU session, the UE transmits an "always-on PDU session requested" indication together with the message.

In operation 302, the SMF may transmit Namf_Communication_N1N2MessageTransfer to the AMF. Here, Namf_Communication_N1N2MessageTransfer may include a PDU session ID and an always-on PDU session granted indication.

In operation 303, the SMF may transmit a Nsmf_PDUsession_UpdateSMContext response to the AMF. Here, the Nsmf_PDUsession_UpdateSMContext response may include a PDU session ID and an always-on PDU session granted indication.

In operation 304, the always-on indicated AMF may update a UE context.

When the SMF, which has received a request for establishment and modification of always-on PDU session, permits the request, the request is indicated in a PDU session establishment accept message or a PDU session modification command message through an "Always-on PDU session granted" indication, and transmitted to the UE. According to various embodiments of the disclosure, the AMF is notified that the corresponding PDU session is an always-on PDU session by using a Namf_Communication_N1N2MessageTransfer or Nsmf_PDUSession_UpdateSMContext response, which is a message transmitted between SMF and AMF and including a PDU session establishment accept message or PDU session modification command message. To this end, an "Always-on PDU session granted" indication is included in not only a PDU session establishment accept/PDU session modification command message but also a Namf_Communication_N1N2MessageTransfer/smf_PDUSession_UpdateSMContext response message for transmission of the PDU session establishment accept/PDU session modification command message. Accordingly, the AMF recognizes that a PDU session to be established is an always-on PDU session and updates a UE context table of the AMF itself.

The reason the AMF needs to know that a PDU session to be established is an always-on PDU session is understood as that the AMF handles a service request procedure and a mobility registration update procedure, which are procedures for the CM-CONNECTED state transition of the UE. Through these two procedures, the UE requests PDU sessions, which need to be subject to user plane activation (UP activation), among PDU sessions of the UE, by using the "list of PDU sessions to be activated" parameter. The AMF, having received the request, requests the user plane activation (UP activation) of the PDU session from the SMF through the Nsmf_PDUSession_UpdateSMContext request. When there is no information indicating that the corresponding PDU session is an always-on PDU session, the AMF may not know that the ID of the always-on PDU session is omitted in the "list of PDU sessions to be activated" parameter, and the user plane resource of the corresponding PDU session is not activated. This is critical for a service sensitive to data transmission latency, such as a URLLC service.

FIG. 4 illustrates UE context in AMF information in a wireless communication system according to various embodiments of the disclosure.

FIG. 4 illustrates UE context in AMF information according to various embodiments of the disclosure.

In AMF, UE context in AMF information is represented by a table in which the AMF stores information associated with handling of a PDU session when a UE has established the PDU session. In various embodiments of the disclosure, an always-on indication is proposed in order to store information indicating that the corresponding PDU session is an always-on PDU session, and the proposed always-on indication is added to a UE context in AMF table. This information is transmitted from the SMF through a Namf_Communication_N1N2MessageTransfer/smf_PDUSession_ UpdateSMContext response message during the PDU Session establishment/PDU session modification procedure of the UE.

Figure 5:
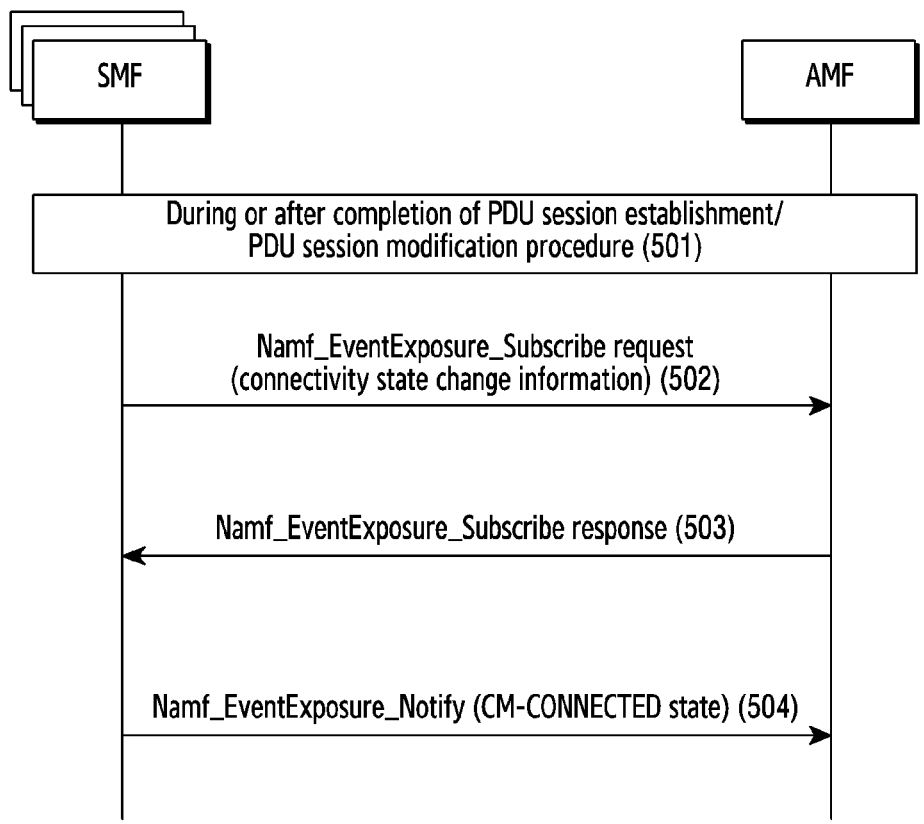
FIG. 5 illustrates a procedure in which an SMF performs an AMF event exposure service subscription in a wireless communication system according to various embodiments of the disclosure.

FIG. 5 illustrates a procedure in which an SMF performs an AMF event exposure service subscription in a wireless communication system according to various embodiments of the disclosure.

Specifically, FIG. 5 illustrates an AMF event exposure service subscription procedure by an SMF according to various embodiments of the disclosure.

In operation 501, the SMF and the AMF may be in the middle of performing the PDU session establishment/PDU session modification procedure or after completion thereof.

This is another embodiment in which the SMF may know the omission of user plane activation (UP activation) of an always-on PDU session. According to the above method, by providing always-on PDU session grated information to the AMF, the AMF recognizes the omission of the user plane activation (UP activation) of the always-on PDU session when the UE transitions to the CM-connected state and notifies the SMF of the omission of UP activation. In this embodiment, connectivity state changes event exposure, which is an AMF event exposure service, is used. The AMF event exposure service provides a notification to a network function (NF) that has subscribed to this service when the UE transitions to the CM-CONNECTED state.

During or after the PDU session establishment/PDU session modification procedure, the SMF, which has granted the always-on PDU session to a UE, subscribes to the connectivity state changes event exposure service of the AMF. Here, limitation may occur such that the SMF may be allowed to subscribe to the connectivity state changes event exposure service only for an always-on PDU session for a latency-sensitive service such as a URLLC service. This is an option that can be limited when load of the AMF or control signaling in a network is excessive.

In operation 502, the SMF may transmit a Namf_EventExposure_Subscribe request message to the AMF. Here, the Namf_EventExposure_Subscribe request message may include connectivity state change information.

The SMF subscribes to the connectivity state changes service of the AMF through a Namf_EventExposure_Subscribe Request message.

In operation 503, the AMF may transmit a Namf_EventExposure_Subscribe response to the SMF.

In operation 504, the SMF may transmit a Namf_EventExposure_Notify message. Here, the Namf_EventExposure_Notify message may include a CM-connected notification.

The AMF approves the connectivity state changes service subscription through a Namf_EventExposure_Subscribe response. When the UE transitions from the CM-idle state to the CM-CONNECTED state, the AMF receives a CM-connected notification from the SMF having subscribed to the connectivity state changes service. Here, the SMF determines whether the UE has requested UP activation for the always-on PDU session and handles the same.

Figure 6:
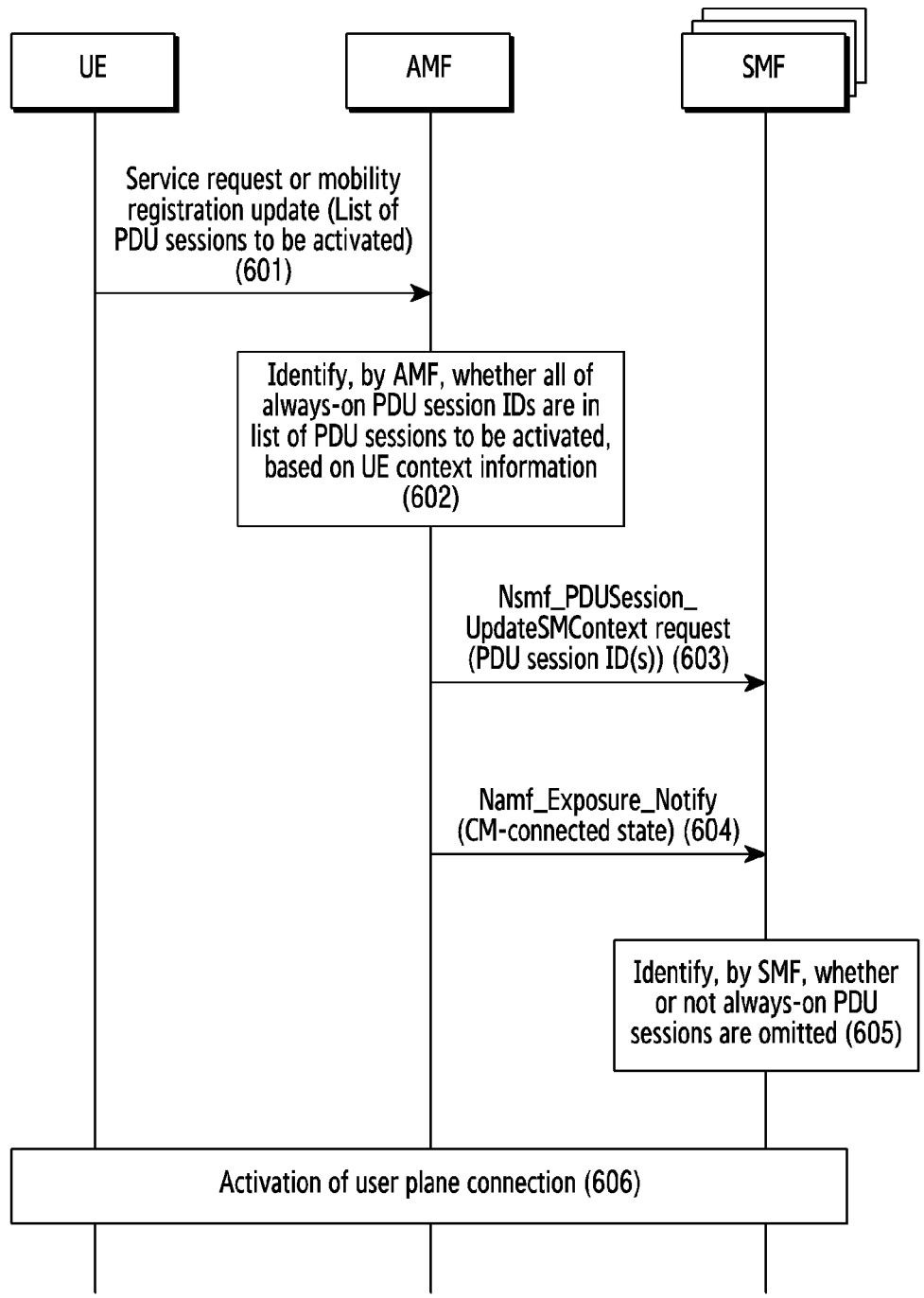
FIG. 6 illustrates a UE service request or mobility registration update procedure in a wireless communication system according to various embodiments of the disclosure.
Figure 7:
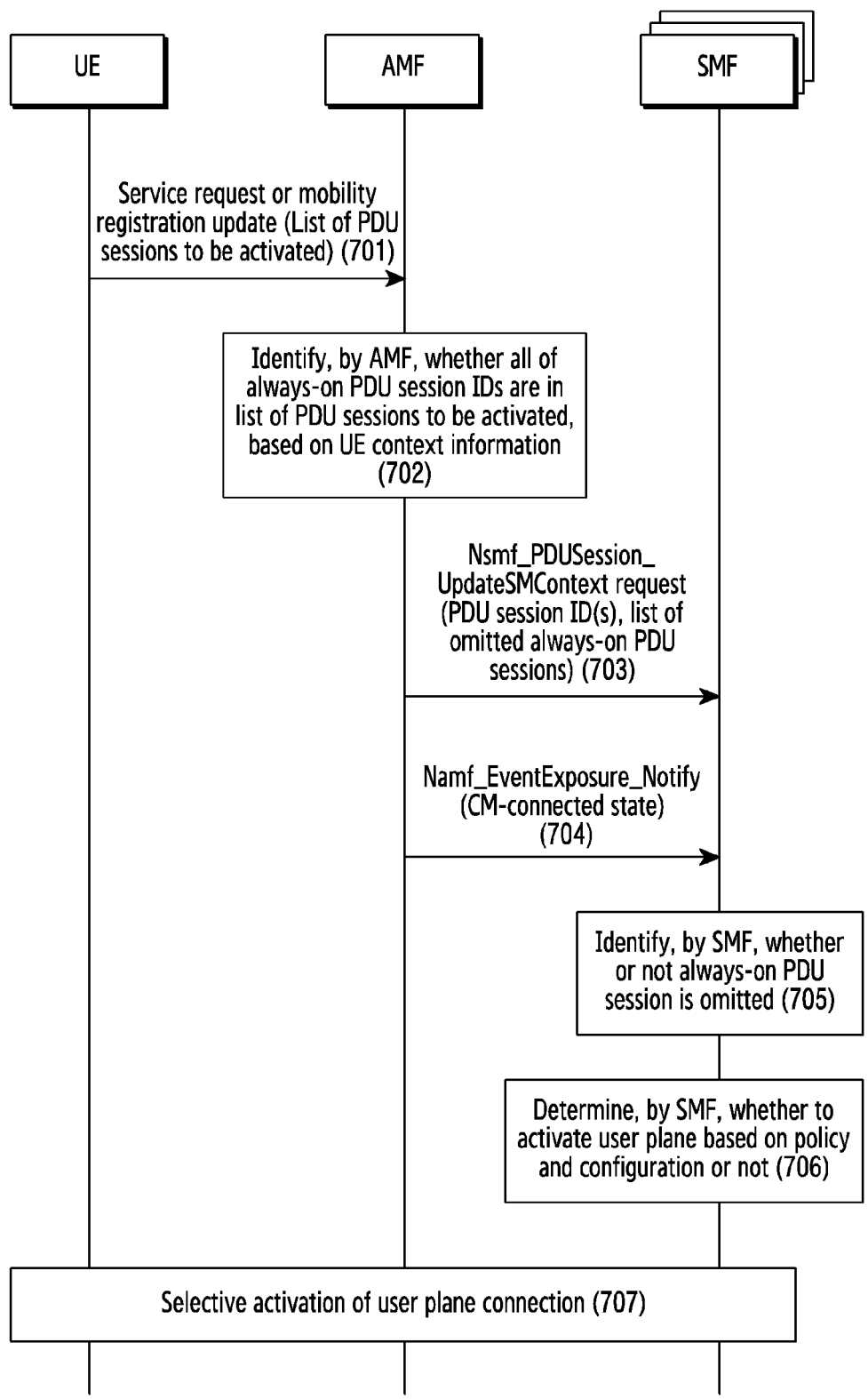
FIG. 7 illustrates a UE service request or mobility registration update procedure in a wireless communication system according to various embodiments of the disclosure.
Figure 8:
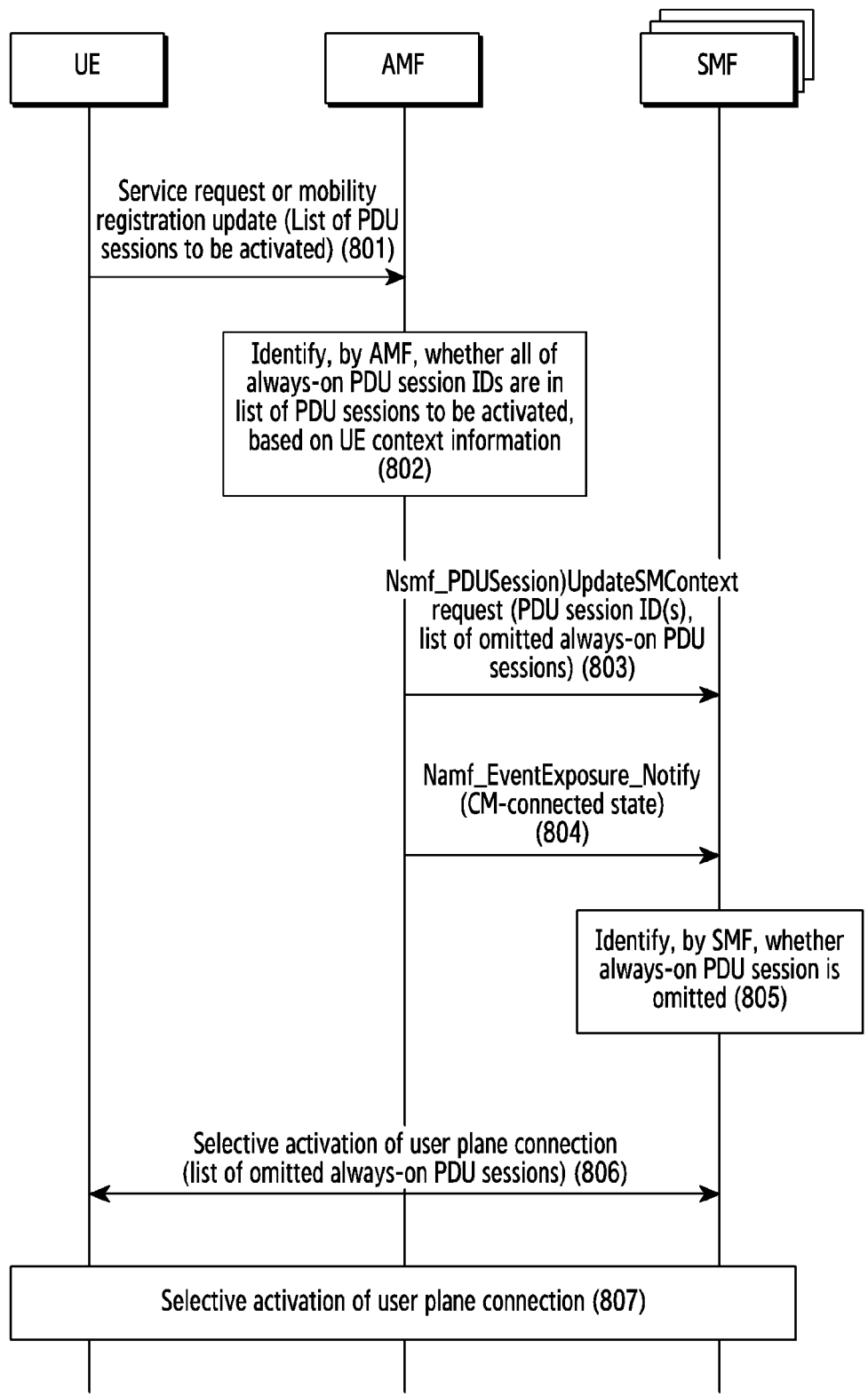
FIG. 8 illustrates a UE service request or mobility registration update procedure in a wireless communication system according to various embodiments of the disclosure.

FIGS. 6 to 8 illustrate a UE service request or mobility registration update procedure according to various embodiments of the disclosure. Each of FIGS. 6 to 8 show various embodiments of handling the omitted always-on PDU session.

The UE transitions to the CM-CONNECTED state when there is signaling or data to be transmitted or in order to update mobility registration. To this end, a service request/mobility registration update procedure is performed. Here, with regard to always-on PDU session or PDU session having data to be transmitted, the UE performs activation of a user plane resource of the corresponding PDU session while performing transition to the CM-connected state. To this end, the UE allocates the PDU session ID to activate the user plane resource to the "list of PDU session to be activated" parameter of the service request/mobility registration update message, and requests the activation from the AMF. Here, a method of handling an always-on PDU session omitted from this list is shown in FIGS. 6 to 8. Operations 602, 702, and 802 in FIGS. 6 to 8, respectively, deal with a case in which the AMF includes information regarding the always-on PDU session through the "always-on PDU session granted" indication to the AMF by the SMF. A procedure of 2b deals with a case in which when the SMF subscribes to the connectivity state changes event exposure service of the AMF and the UE transitions to the CM-connected state, the AMF transmits a notification to the SMF.

FIG. 6 illustrates a UE service request or mobility registration update procedure in a wireless communication system according to various embodiments of the disclosure.

In operation 601, a UE may transmit a service request or a mobility registration update to an AMF. Here, the service request or mobility registration update may include a list of PDU sessions to be activated.

In operation 602, the AMF may identify, based on UE context information, whether all of always-on PDU session IDs are in a list of PDU sessions to be activated.

In operation 602, when the AMF has known that user plane activation (UP activation) of an always-on PDU session is omitted, the UE requests activation of a user plane resource of the corresponding PDU session from the SMF through a Nsmf_PDUSession_UpdateSMContext request message, like the existing UP activation method.

In operation 603, the AMF may transmit a Nsmf_PDUSession_UpdateSMContext request message to the SMF. Here, the Nsmf_PDUSession_UpdateSMContext request message may include PDU session ID(s).

In operation 604, the AMF may transmit a Namf_Exposure_Notify message to the SMF. Here, the Namf_Exposure_Notify message may include a CM-connected state notification.

In operation 605, the SMF may identify whether the always-on PDU sessions have been omitted.

In operation 605, when the SMF receives a CM-connected notification from the AMF and identifies whether there is an always-on PDU session of the corresponding UE, the UP activation of the PDU session is performed.

In operation 606, the UE, the AMF, and the SMF may perform a user plane connection activation procedure.

In FIG. 6, when the omission of user plane activation (UP activation) of the always-on PDU session is identified, the AMF/SMF handles the omission by simply performing UP activation thereof.

FIG. 7 illustrates a UE service request or mobility registration update procedure in a wireless communication system according to various embodiments of the disclosure.

In operation 701, a UE may transmit a service request or a mobility registration update to an AMF. Here, the service request or mobility registration update may include a list of PDU sessions to be activated.

In operation 702, the AMF may identify, based on UE context information, whether all of always-on PDU session IDs are in a list of PDU sessions to be activated.

In operation 702, when the AMF has known that the user plane activation (UP activation) of the always-on PDU session is omitted, the AMF includes a list of omitted always-on PDU sessions in a Nsmf_PDUSession_UpdateSMContext request message and provides a notification of the same to the SMF.

In operation 703, the AMF may transmit a Nsmf_PDUSession_UpdateSMContext request to the SMF. Here, the Nsmf_PDUSession_UpdateSMContext request may include PDU session ID(s) and a list of omitted always-on PDU sessions.

In operation 704, the AMF may transmit a Namf_EventExposure_Notify message to the SMF. Here, the Namf_EventExposure_Notify message may include a CM-connected state notification.

In operation 705, the SMF may identify whether or not the always-on PDU session has been omitted.

In operation 705, the SMF receives a CM-connected notification from the AMF and identifies whether there is an omitted always-on PDU session of the corresponding UE.

In operation 706, the SMF may determine whether to activate the user plane based on the policy and configurations or not.

In operation 706, when the SMF identifies the omission of user plane activation of the always-on PDU session, the SMF determines whether to perform user plane activation (UP activation) according to local policy information or configuration information.

In operation 707, the user equipment (UE), the AMF, and the SMF may perform a procedure of selectively activating a user plane connection.

According to an embodiment, since the URLLC service is sensitive to transmission latency, the corresponding PDU session performs user plane activation (UP activation).

FIG. 8 illustrates a UE service request or mobility registration update procedure in a wireless communication system according to various embodiments of the disclosure.

In operation 801, a user equipment (UE) may transmit a service request or mobility registration update to the AMF. Here, the service request or mobility registration update may include a list of PDU sessions to be activated.

In operation 802, the AMF may identify, based on the UE context information, whether all of always-on PDU session IDs are in a list of PDU sessions to be activated.

In operation 802, when the AMF has known that the user plane activation (UP activation) of the always-on PDU session is omitted, the AMF includes a list of omitted always-on PDU sessions in a Nsmf_PDUSession_UpdateSMContext request message and provides a notification of the same to the SMF.

In operation 803, the AMF may transmit a Nsmf_P-DUSession)UpdateSMContext request message to the SMF. Here, the Nsmf_PDUSession)UpdateSMContext request message may include PDU session ID(s) and a list of omitted always-on PDU sessions.

In operation 804, the AMF may transmit a Namf_EventExposure_Notify message to the SMF. Here, the Namf_EventExposure_Notify message may include a CM-connected state notification.

In operation 805, the SMF may identify whether the always-on PDU session has been omitted.

In operation 805, the SMF receives a CM-connected notification from the AMF and identifies whether there is an omitted always-on PDU session of the corresponding UE.

In operation 806, the SMF and the UE may transmit and receive an activation message of a user plane request. Here, the activation message of the user plane request may include a list of omitted always-on PDU sessions.

In operation 807, the UE, the AMF, and the SMF may perform a procedure of selectively activating a user plane connection.

When the SMF identifies omission of user plane activation (UP activation) of the always-on PDU session, the SMF requests whether to perform user plane activation (UP activation) from the UE. To this end, the SMF includes a list of omitted always-on PDU sessions in a message requesting activation of user plane and transmit the same, and accordingly, the SMF performs user plane activation (UP activation) of the corresponding PDU session according to the request of the UE.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The disclosure generally relates to a wireless communication system and, more particularly, to an apparatus and a method for handling an always-on PDU session.

The invention claimed is:

1. A method performed by an access and mobility management function (AMF) in a wireless communication system, the method comprising:
receiving, from a user equipment (UE), a first message including a list of protocol data unit (PDU) sessions to be activated;
identifying, based on UE context information of the UE, whether identifiers (IDs) of all of always-on protocol data unit (PDU) sessions are included in the list of PDU sessions to be activated; and
in case that at least one always-on PDU session omitted from the list of the PDU sessions to be activated is identified, transmitting, to a session management function (SMF), a second message including information for requesting user plane activation of the at least one always-on PDU session.

2. The method of claim 1, wherein the second message further includes the list of the PDU sessions to be activated and a list of the at least one always-on PDU sessions.

3. The method of claim 1, further comprising
transmitting, to the SMF, information on a connection management-connected (CM-connected) state notification of the UE; and
performing a user plane activation procedure for the at least one always-on PDU session.

4. The method of claim 3,
wherein the user plane activation procedure is selectively performed based on local policy information or configuration information.

5. The method of claim 3,
wherein the user plane activation procedure is selectively performed based on a communication of the SMF and the UE related to the at least one always-on PDU session.

6. A method performed by a session management function (SMF) in a wireless communication system, the method comprising:
receiving, from an access and mobility management function (AMF), a second message including information for requesting user plane activation of at least one always-on protocol data unit (PDU) session, which is omitted from a list of PDU sessions to be activated of a user equipment (UE) included in a first message transmitted from the UE to the AMF;
receiving, from the AMF, information on a connection management-connected (CM-connected) state notification of the UE; and identifying whether the at least one always-on PDU session has been omitted from the list of PDU sessions to be activated.

7. The method of claim 6,
wherein the second message further includes the list of the PDU sessions to be activated and a list of the at least one always-on PDU sessions.

8. The method of claim 6, further comprising
determining whether to perform a user plane activation procedure for the at least one always-on PDU session; and
performing a user plane activation procedure for the at least one always-on PDU session.

9. The method of claim 8,
wherein whether to perform the user plane activation procedure for the at least one always-on PDU session is selectively determined based on local policy information or configuration information.

10. The method of claim 8, wherein whether to perform the user plane activation procedure for the at least one always-on PDU session is selectively performed based on a communication of the SMF and the UE related to the at least one always-on PDU session.

11. An access and mobility management function (AMF) in a wireless communication system, the AMF comprising:
a transceiver; and
at least one processor coupled with the transceiver,
wherein the at least one processor is configured to:
receive, from a user equipment (UE), a first message including a list of protocol data unit (PDU) sessions to be activated;
identify, based on UE context information of the UE, whether identifiers (IDs) of all of always-on protocol data unit (PDU) sessions are included in the list of PDU sessions to be activated; and
in case that at least one always-on PDU session omitted from the list of the PDU sessions to be activated is identified, transmit, to a session management function (SMF), a second message including information for requesting user plane activation of the at least one always-on PDU session.

12. The apparatus AMF of claim 11,
wherein the second message further includes the list of the PDU sessions to be activated and a list of the at least one always-on PDU sessions.

13. The AMF of claim 11, wherein the at least one processor is further configured to:
transmit, to the SMF, information on a connection management-connected (CM-connected) state notification of the UE; and
perform a user plane activation procedure for the at least one always-on PDU session.

14. The AMF of claim 13, wherein the user plane activation procedure is selectively performed based on local policy information or configuration information.

15. The AMF of claim 13, wherein the user plane activation procedure is selectively performed based on communication of the SMF and the UE related to the at least one always-on PDU session.

* * * * *